United States Patent [19]
Cummings, III

[11] Patent Number: 5,667,045
[45] Date of Patent: Sep. 16, 1997

[54] CONTINUOUSLY VARIABLE FAN DRIVE CLUTCH ARRANGEMENT

[75] Inventor: Gordon F. Cummings, III, Rockford, Ill.

[73] Assignee: Rockford Powertrain, Inc., Rockford, Ill.

[21] Appl. No.: 532,226

[22] Filed: Sep. 19, 1995

Related U.S. Application Data

[63] Continuation-in-part of Ser. No. 529,357, Sep. 18, 1995, abandoned.

[51] Int. Cl.$^6$ .................... F16D 67/04; F16D 25/02; F16D 43/25
[52] U.S. Cl. ............... 192/18 A; 192/70.12; 192/82 T; 192/91 A; 192/103 F; 123/41.12
[58] Field of Search .................. 192/18 A, 12 C, 192/70.12, 91 A, 85 CA, 82 T, 58.42, 103 F, 113.34; 123/41.12

[56] References Cited

U.S. PATENT DOCUMENTS

| | | | |
|---|---|---|---|
| 3,207,279 | 9/1965 | Ahlen | 192/104 F X |
| 3,324,981 | 6/1967 | Aschauer | 192/48.2 |
| 3,587,537 | 6/1971 | Spokas et al. | 192/70.12 X |
| 3,804,219 | 4/1974 | Cummings, III | 192/82 T |
| 3,915,269 | 10/1975 | Houser | 192/18 A |
| 4,074,663 | 2/1978 | Cory | 123/41.12 |
| 4,094,393 | 6/1978 | Spokas | 192/82 T |
| 4,214,652 | 7/1980 | Quenneville | 192/82 T X |
| 4,231,457 | 11/1980 | Cornish | 192/82 T |
| 4,238,017 | 12/1980 | Spokas | 192/82 T |
| 4,348,990 | 9/1982 | Nolte et al. | 123/41.12 |
| 4,425,879 | 1/1984 | Shadday et al. | 123/41.12 |
| 4,456,110 | 6/1984 | Hanks et al. | 192/82 T |
| 4,555,910 | 12/1985 | Sturges | 62/184 |
| 4,589,535 | 5/1986 | Hall et al. | 192/70.12 |
| 4,694,946 | 9/1987 | Pearch et al. | 192/85 AA |
| 4,828,088 | 5/1989 | Mohan et al. | 192/58.62 |
| 4,899,861 | 2/1990 | Cummings, III | 192/85 AA |
| 5,487,457 | 1/1996 | Isanhart | 192/58.2 |

OTHER PUBLICATIONS

Fan Drives for Electronic Diesel Engines, article from *Diesel Progress Engines & Drives*, date unknown.

"Digital Hall Effect Position/Motion Sensing of Off Road Equipment Components" by Thomas J. Gastel of Micro Qwitch –Sep. 12–15, 1988.

*Primary Examiner*—Richard M. Lorence
*Attorney, Agent, or Firm*—Leydig, Voit & Mayer, LTD

[57] ABSTRACT

A clutch mechanism for a cooling fan of a size capable of fitting into the limited envelope available in an over-the-road diesel tractor. A compact housing has a belt drive input and an output connected to the fan hub. A wet clutch is included within the housing lubricated by oil from the engine lubrication system. The housing includes an internal positive displacement booster pump cooperating with a controllable valve in the oil return line to the engine sump. When it is desired to operate the clutch, the valve is controllably closed to restrict flow from the clutch mechanism to the engine sump line. The positive displacement pump thereupon causes an increase in pressure in a pressure chamber in the housing, which acts on an internal piston to translate the clutch in a continuously variable manner between engaged and disengaged conditions.

17 Claims, 5 Drawing Sheets

CONTINUOUSLY VARIABLE FAN DRIVE CLUTCH ARRANGEMENT

CROSS-REFERENCE TO A RELATED APPLICATION

This is a continuation-in-part of my application Ser. No 08/529,357, filed Sep. 18, 1995 (now abandoned).

FIELD OF THE INVENTION

This invention relates to cooling fan clutch mechanisms particularly suited for large, over-the-road diesel tractors, and more particularly, to an improved fan clutch which is small in size yet provides reliable continuously variable speed control.

BACKGROUND OF THE INVENTION

Cooling requirements for internal combustion engines are subject to wide variations depending upon operating conditions. When the engine is cold or cool, little or no cooling is required. Indeed, in very cold operating conditions, cooling can be undesirable. During engine operation, the degree of cooling required varies as a function of engine load, and with external conditions such as air temperature and wind or vehicle velocity.

The conventional internal combustion engine vehicle is provided with an engine driven fan. The fan can absorb a considerable proportion of the total output power of an engine. For example, in large diesel over-the-road tractors, the fan might require as much as 55 horsepower. With that in mind, and considering the requirements for fuel efficiency, fan drives have been developed which operate only when cooling is needed. Thus, when the engine is operating in normal load and at cruising speeds, there can be adequate air flow through the radiator without the fan, to allow the fan to be declutched. In stop-and-go traffic, under heavy load, or when parked and idling, the clutch can be engaged to couple the fan to the engine and provide cooling air flow when the coolant temperature demands.

If space were not a problem, it would be relatively straightforward to provide a continuously variable relatively reliable clutch mechanism to associate with the fan drive in a diesel tractor. However, when one works "under the hood" and appreciates the desires of truck and engine designers to efficiently use that under-the-hood space, one soon appreciates that a relatively small envelope is available for the clutch mechanism. The envelope is limited axially by the distance between the radiator and the engine, and it is limited radially, as a practical matter, by the size of the sheave which can be accommodated for the pulley drive which conventionally drives the fan.

The clutch mechanisms which have been used heretofore, have not been without their problems. One approach is to utilize a dry clutch, but that typically results in on/off operation, since the dry clutch could not slip for long without overheating. Inherent in on/off applications is the typical shock load to the drive unit when the drive clutch is engaged. The shock load is not only undesirable from the viewpoint of loading and wear on the drive components, but is also aesthetically detrimental. For example, when the vehicle is parked during a driver's rest, but the engine is running in order to maintain heat or cooling, the fan clutch will typically cycle on and off. Even with good sound insulation between the engine compartment and the cab, the fan cycling can create a significant periodic audible disturbance.

One attempt to avoid these problems with dry clutch fan drives has been the attempted use of viscous coupling between the input and output members of the drive unit. These approaches have also had their drawbacks. First of all, viscous couplings have poor release capability and no lock-up capability. In other words, a viscous coupling will not permit the drive input and output members to be driven at the same speed. Moreover, fan drives using viscous couplings have limited horsepower capability, and cannot quickly dissipate heat buildup in the unit. Most viscous coupling designs are slow to engage after sensing heat, and cannot be locked in the off position when cooling is not desired.

Certain approaches have been developed for using wet clutches in fan drives. However, wet clutches with adequate horsepower for fan drive operation have been less compact than desired for some applications. For example, in off-the-road vehicles, such as tractors, loaders, graders and the like, there is adequate room in the engine compartment to tolerate a clutch drive mechanism of the size associated with a typical wet clutch device.

The wet clutch mechanism is very desirable in that it can provide relatively continuously variable speed, and will not, by virtue of the oil bathed clutch mechanism, overheat under most conditions. The wet clutch mechanism is typically operated from oil in the engine sump, and particularly when the vehicle is of the type which has a relatively wide range of engine operating rpm's, and therefore a relatively wide range of operating oil pressures, the clutch mechanism must be designed with sufficient operating area for the hydraulic piston to effectively operate the clutch at the oil pressure extremes. That usually requires a rather large piston area associated with the clutch so that reliable operation can be achieved from relatively low oil pressures at idle to relatively high oil pressures at high engine rpm. While those problems have proven to be solvable in off-the-road type vehicles where space is important but not at a significant premium, there are applications where the space requirements can pose a problem.

For example, in over-the-road diesel tractors, the requirements for aerodynamics, appearance, vehicle size, vehicle weight, and the like have all combined to reduce the size of the engine compartment and pack that compartment with operating components. As a result, the envelope available for installation of a fan clutch mechanism in the over-the-road vehicle is not large. That envelope has typically accommodated a dry clutch on/off clutch mechanism, and control wiring has been such as to allow a single wire to an air control valve which controls the fan clutch. Thus, in the typical over-the-road vehicle, a small and relatively reliable dry clutch mechanism is used in an on/off mode, with the problems inherent in such a limited device.

It would be desirable to provide continuously variable speed control of the clutch mechanism, but without a redesign of the engine compartment needed to accommodate a larger clutch mechanism. The provision of variable speed control would indeed provide enhanced engine operating efficiency in driving the fan only so fast as is needed for a particular set of cooling requirements, and would do away with the shock loads and audible disturbances inherent in on/off operation. However, heretofore it has not been possible to achieve the combination of small envelope, reliable operation and continuously variable drive in a long life clutch mechanism.

SUMMARY OF THE INVENTION

In view of the foregoing, it is a general aim of the present invention to provide a continuously variable speed control for an engine fan in a package compatible with over-the-road vehicle requirements.

In accomplishing that aim, it is an object to utilize a wet clutch mechanism coupled with a control particularly adapted to the wide range of operating conditions typically associated with an over-the-road vehicle.

Even more particularly, an object of the present invention is to provide a fan drive clutch mechanism which is of the wet clutch variable speed variety, which operates on circulating engine oil, and which has associated therewith the capacity to adapt itself to the wide range of engine oil pressure levels normally encountered in vehicle operation.

A further object of the invention is to provide such a clutch mechanism which can respond to multiple sensor inputs to adjust the fan speed in accordance with those multiple inputs, but without complicating the clutch mechanism.

In that respect, an object is to provide a hydraulic system for a wet clutch mechanism in a fan drive assembly which is capable of responding to an electrical signal carried on a single pair of wires.

It is a feature of the invention that the hydraulic operating mechanism for a wet drive fan clutch has associated therewith an internal booster pump driven by the clutch mechanism itself. The booster pump cooperates with a controllable linear valve. Operation of the valve boosts the pressure at the output of the booster pump, and that pressure is utilized to actuate the clutch mechanism. Thus, the clutch is adaptable to very low pressure operation in that even with a low pressure oil flow into the clutch, the booster pump is sized to increase that pressure to levels adequate to operate the clutch mechanism under all conditions.

Other objects and advantages will become apparent from the following detailed description when taken in conjunction with the drawings, in which:

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
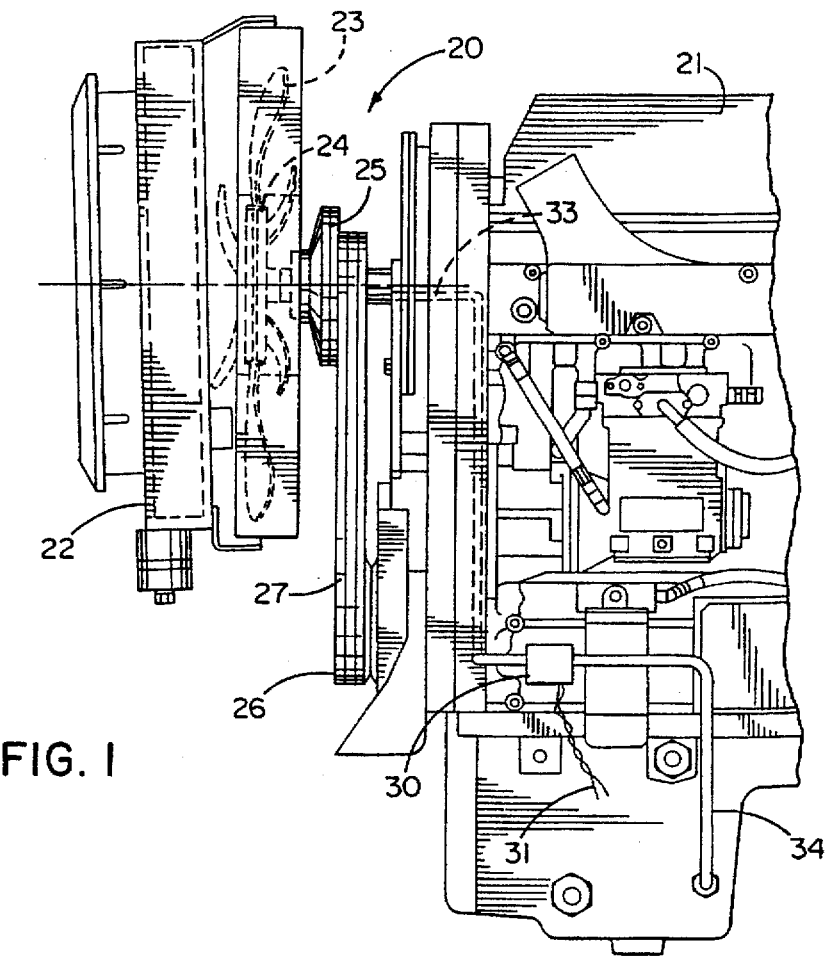
FIG. 1 is a partial elevation showing the front end of a diesel engine associated with a cooling radiator and fan/fan drive clutch constructed in accordance with the invention, and representing a typical installation in an over-the-road diesel tractor.

Turning now to the drawings, a fan drive 20 of FIG. 1 is shown in association with a diesel engine 21 and a conventional truck radiator 22. The diesel engine 21 is of the variety typically associated with over-the-road tractor vehicles, and the radiator 22 is a large capacity type capable of supplying cooling for over-the-road diesel engines. A fan 23 is shown connected to a fan hub 24 which in turn is driven by a fan clutch mechanism 25. The fan clutch mechanism 25 is driven by a crankshaft output pulley 26 connected to a sheave of the fan drive 25 by a set of drive belts 27. The clutch mechanism 25 couples power transmitted by the belt drive 27 from the engine to the fan 23.

In accordance with the invention, the clutch mechanism 20 has a continuously variable output speed, controlled by an electrical signal responsive to cooling needs, so that the fan 23 rotates at a speed needed by the engine for adequate cooling. In some cases, of course, the fan 23 can be operated in an overspeed condition to provide additional cooling in certain conditions, and in many cases, of course, the fan 23 will be declutched, so that the load by the drive assembly 27 on the engine 21 is at a very minimum.

Associated with the fan clutch 20 is a fan clutch solenoid 30 which is conveniently mounted near or on the engine block. Only a single pair of wires 31 (or if the engine is used as a ground, only a single wire), is used to provide a continuously variable electrical signal to the solenoid. The fan clutch receives circulating lubricating oil flow from the engine oil distribution system. The pressure in the engine oil system varies depending on engine rpm, and can vary from anywhere from 6 to 100 or more psi. The fan clutch also has an output oil line 33 for return of oil to the engine sump. In practicing the invention, the line 33 is coupled to the solenoid 30 and from the solenoid back to the engine sump 34. As will be described in greater detail below, the electrical signal operates the solenoid 30 to restrict the oil return line and thereby control the internal pressure in the fan clutch piston housing. As will be described in greater detail, that is the mechanism which operates the fan clutch to either clutch or declutch the drive from the fan.

Figure 2:
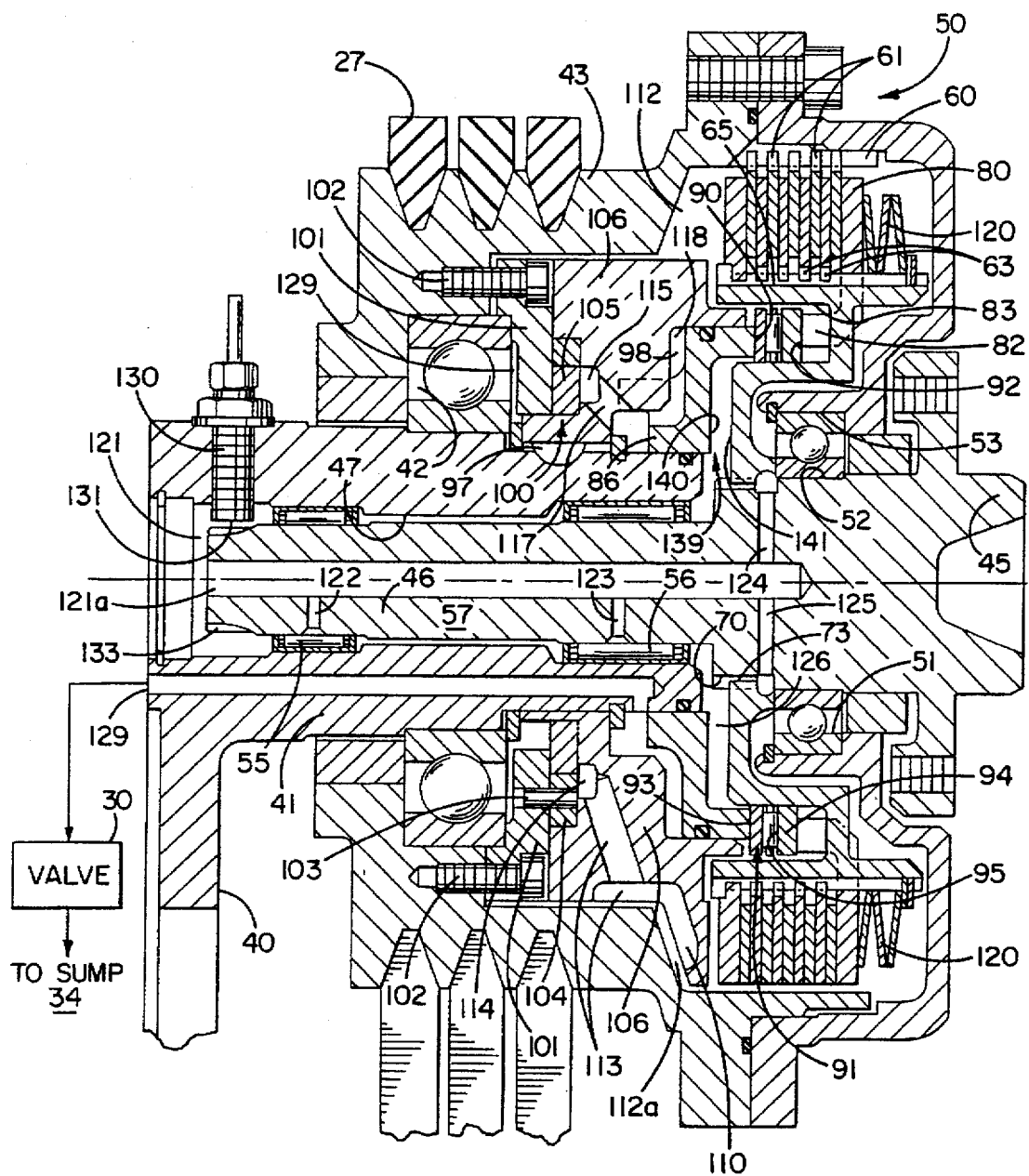
FIG. 2 is a cross-sectional view of the fan drive clutch of FIG. 1.

Turning then to FIG. 2, it should first be appreciated that the cross section of FIG. 2 is shown inverted with respect to FIG. 1, with the fan hub illustrated on the right of the drawing. The fan clutch assembly of FIG. 2 includes a mounting bracket 40 which is securely affixed to the engine. The bracket 40 has an axial mounting post 41, cylindrical in cross section, which serves as a mounting base for the rotating elements on the fan drive.

It will be seen that the base 41 is cylindrical and hollow. Externally, it supports a main bearing 42 which mounts a main drive housing 43 configured to fit a belt drive 27. The belt drive 27 is located just above the bearing 42 so that the load on the bearing is generally radial with respect to the mounting shaft 41. A fan drive hub 45 has an extended shaft 46 which fits within a cylindrical aperture 47 of the mounting support 41. A clutch mechanism generally indicated at 50 variably connects the main drive housing 43 to the fan drive hub 45. When the clutch is fully engaged, the hub 45 rotates at the same speed as the main input housing 43. As the clutch is gradually disengaged, the fan drive hub 45 slows down (with respect to the main input drive 43), until the clutch is fully declutched, in which case the hub 45 is stationary while the input housing 43 continues to rotate as driven by the belt drive 27.

For rotatably supporting the fan hub 45 with respect to the main rotatable housing 43, a further ball bearing 51 is interposed between a machined surface 52 on the hub and a further surface 53 in the main drive housing. Roller bearings 55, 56 engage a shaft portion 57 of the drive hub 45, and support the hub for rotation within the cylindrical housing 41. Oil seals and retainer rings and the like are shown in the drawings, but will not be described in great detail in this specification. It will be expected that one of ordinary skill in the art will recognize the structure and functionality of such elements from their appearance in the detailed drawings.

Referring to the clutch mechanism 50, it will be seen that the driven housing 43 has an annular flange 60 which carries a plurality (in this instance 5) driven clutch plates 61. The clutch plates 61 are axially slidable in splines on the flange 60 so that they are rotated with the housing 43. Interfit within the driving clutch plates 61 are a plurality (in this instance, 4) driven clutch plates 63. The driven clutch plates in turn are carried on an internal hub 65. The clutch plates 63 are axially slidable on splines on the hub 65 (see FIG. 5) so that the clutch plates can slide axially with respect to each other to either engage or release the clutch. The hub 65 also has an internal spline 73 which engages an external spline 70 on the hub 45. When the clutch is engaged, the clutch plates 61 engage the clutch plates 63 which cause the clutch hub 65 to rotate, which in turn causes the fan hub 45 to rotate by virtue of the splined connection at 70, 73.

Figure 5:
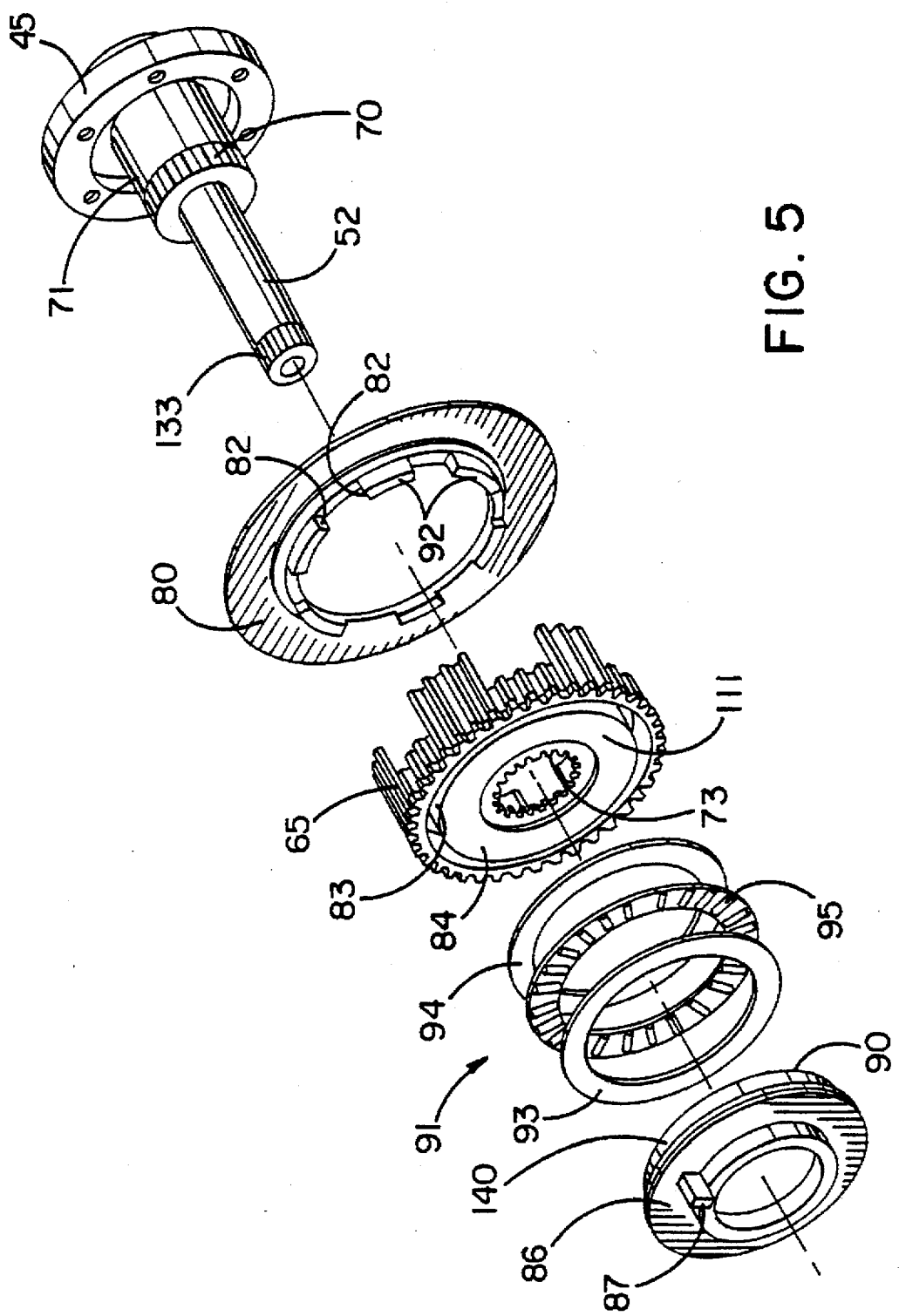
FIG. 5 is an exploded perspective showing certain of the mechanical components of the fan drive clutch of FIG. 2.

That operation will be better appreciated by brief reference to FIG. 5. There is shown an external spline 70 on a hub portion 71 of the drive hub 45. The external spline 70 mates with an internal spline 73 on the clutch hub 65 to form the splined connection 70, 73 described in connection with FIG. 2. That is the connection by which the clutch mechanism drives the fan hub 45.

For actuating the clutch 50, and referring concurrently to FIGS. 2 and 5, it will be seen that a pressure plate 80 is provided, and is disposed to the right (in FIG. 2) of the interfit clutch plates 61, 63. The pressure plate 80 has a plurality of fingers 82 which project through openings 83 in the clutch hub 65. A clutch piston 86 is mounted, as by a sliding key 87, over the stationary mounting shaft 41 so as to be axially translatable to translate the pressure plate 80 to operate the clutch 50. Interposed between an operating face 90 of the clutch piston and operating faces 92 of the pressure plate is a thrust-bearing assembly 91. The assembly 91 includes a pair of thrust washers 93, 94, one adjacent to the operating face 90 of the clutch piston, and one in contact with the operating face 92 of the pressure plate. Interposed between the thrust washers 93, 94 is a cylindrical needle-bearing assembly 95 which allows for relative rotation between the two thrust washers 93, 94. Thus, axial force which is generated by the clutch piston 86 is transmitted through the thrust washer assembly 91 to the piston pressure plate 80 to control the amount of pressure on the clutch plates 61, 63.

In accordance with an important aspect of the invention, the clutch mechanism is provided with an internal pressure boost mechanism, driven by the fan drive, and adapted to provide sufficient hydraulic operating pressure to operate the clutch over all expected operating conditions of the engine. To that end, a positive displacement booster pump 100 is contained within the clutch drive housing, and the hydraulic connections to and from the clutch are configured so as to control internal pressure in the chamber created by the internal booster pump. Referring again to FIG. 2, it will be seen that the booster pump 100 is located just to the right of the main ball bearing 42. A pump cover 101 is secured as by bolts 102 to the main drive housing 43, so that the pump cover is rotated whenever the engine rotates the main drive. Connected to the pump cover 101, as by a series of dowel pins 103, is an external gear 104 of a positive displacement gear pump. The external gear 104 is meshed with and cooperates with an internal gear 105 to form a positive displacement pump. A pump housing 106 is mounted on the stationary post 41 and prevented from rotating by a key 97. The pump housing 106 guides the internal gear 105 of the gear pump along an eccentric path with respect to the external gear 104 which drives it. When the external gear 104 is rotated due to the pinned and bolted connections to the external housing, the internal gear 105 also rotates. Thus, the respective outer and inner gears of the gear pump are rotating in eccentric engagement to create a pumping effect on oil presented to the pump.

For the purpose of providing oil to the pump, it will be seen that a pump inlet port 114 is connected by a passage 113 to an area 112a which, with the drive housing 43, forms a Pitot tube 110. As will be described below, an annular sump 112, which is a main oil sump for the clutch assembly, acts as an oil supply for the Pitot tube 110. For the moment, let it be assumed that oil is available in the sump 112. The relative rotation of the external housing 43 with respect to the internal stationary pump housing 106, and the positioning of the inlet of the Pitot tube 110 is such that the oil in the sump 112 is carried by velocity and pressure upwardly into the passage 113 to the inlet chamber 114 of the gear pump 100. Oil is then carried by the cooperating gears of the gear pump, to be pumped out of an oil outlet 115 shown in the top portion of the drawing. The oil which is pumped by the positive displacement pump, then traverses a passage 117 to enter a pressure chamber 118 disposed between the clutch piston 86 and a fixed portion 98 of the pump housing 106.

Figure 3:
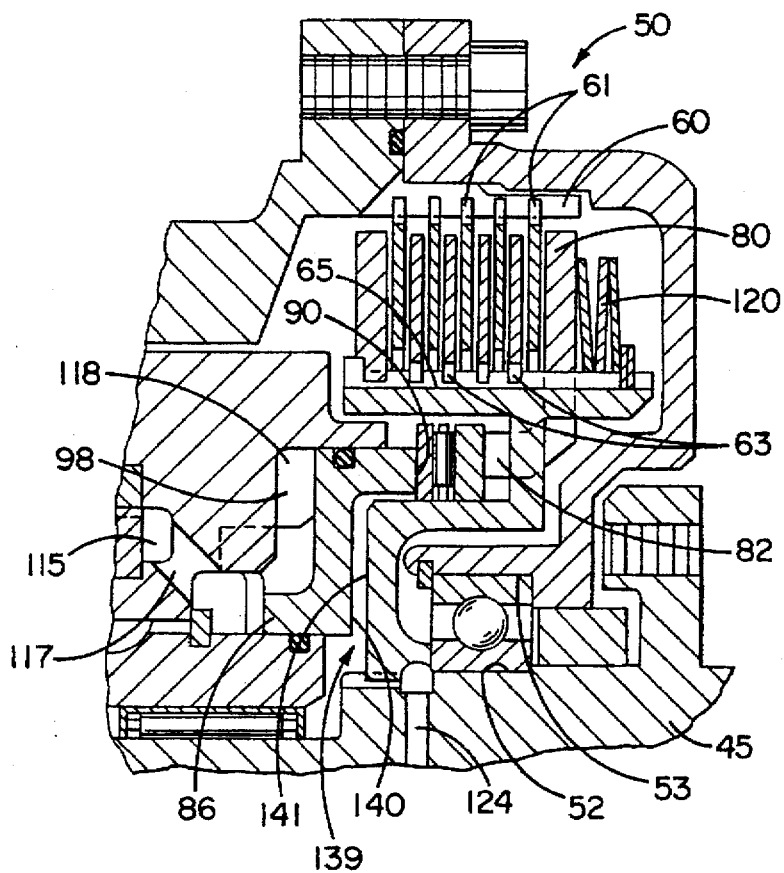
FIGS. 3 and 4 are partial views similar to FIG. 2 showing different operating conditions of the fan drive clutch of FIG. 2.

As will be described below, the clutch is operated by increasing back pressure at the outlet of the pump. For the moment, simply accepting that back pressure will increase, it will be seen that when the outlet is restricted so that pressure in the chamber 118 is increased, the clutch piston 86 is displaced to the right as shown in FIG. 3. That acts through the thrust bearing 91 to translate the pressure plate 80 to the right, compressing a Belleville spring 120. This intermediate condition is illustrated in FIG. 3. The reduction in pressure exerted on the intermeshed clutch plates 61, 63 allows the clutch to begin to slip, and that allows the fan hub 45 to slow down with respect to the input housing 43. Releasing of the pressure in the chamber allows the Bellville spring 120 to again compress the plates 61, 63, causing the fan hub 45 to be driven as the same speed as the internal housing 43.

In practicing the invention, the clutch mechanism is oil lubricated, using the lubricating system from the vehicle. An aperture 121 in the main bracket 40 mates to the engine (see generally FIG. 1) to receive a flow of lubricating oil from the engine. The engine oil flow is controlled by the conventional engine oil pump, and the oil pressure is typically dependent on engine rpm. Oil which enters the clutch through inlet 120 is coupled through an internal bore 121a in the fan drive hub. Passages 122, 123 are provided for lubricating the roller bearings 55, 56. Further passages 124, 125 are provided for lubricating the main hub bearing 51, the clutch 50 and bearing assembly 91. The oil which is passed through the passages 122–125 to the respective bearing sets combines again in a further passage 126 and is passed to lubricate the brake release bearing and clutch mechanism. After the oil passes through the clutch mechanism, it collects in the sump 112. The sump 112 in turn supplies oil to the pump inlet 114 and thence to the outlet 115. It will be seen that the outlet, in addition being connected by a passage 117 to the pressure chamber 118, also has a small bleed passage 129 connected to lubricate the main bearing 42 and return to the sump 112.

It will also be noted, before leaving FIG. 2, that means are provided for sensing the actual speed of the fan hub to be used in a control system for fan speed. Thus, a speed sensor 130 is fixed in the housing 41, and has a sensing face 131 which faces a toothed section 133 on the hub shaft (see FIG. 5). Thus, as the hub rotates, the sensor 130 counts the passage of gear teeth 133, and electrical circuitry counts the number of teeth passing per unit time to determine the rotational speed of the hub. Due to the precise control of hub speed which is achievable in accordance with the present invention, means can be provided for electrically setting a desired fan speed and assuring that the fan is rotating at the desired speed by means of the speed sensing pickup.

Referring briefly to FIG. 1, it is recalled that a linear valve 30 was mounted near the engine in the path of return oil from the clutch housing 20 to the engine sump. Electrical connections to the valve 30 allow for the continuously variable adjustment of a restricting orifice in the return line. It will now be apparent that the control of the restricting orifice allows for the control of back pressure in the clutch housing. It will further now be apparent that back pressure in the clutch housing serves to operate the clutch piston 86, and thereby cause the partial or full release of the clutch 61, 63. Since the magnitude of the electrical control signal determines the size of the restriction of the valve 30, and since the size of the restriction of the valve 30 determines the back pressure created in the pressure chamber, and generated from the normal engine oil flow as boosted by the positive displacement pump, the size of the restriction directly controls the position of the piston and therefore the state of the clutch mechanism. The manner in which that mechanism operates to control the fan speed will now be described.

Fundamentally, the clutch drive of this invention is a multi-plate wet (oil-lubricated) clutch 61, 63 which variably connects a cooling fan hub 45 of a vehicle to an engine driven input 43, in response to an electrical signal. The electrical control signal is generated, as will be described below, from engine control electronics, or otherwise. A control circuit senses the actual fan speed by means of a speed pickup 130 and thus has the capacity for rather precise feedback control over fan speed.

In the illustrated embodiment, the fan drive is pulley driven (drive 26), and bracket mounted (40, 41) to the engine. Desirably, oil from the internal combustion engine is ported at 121 into the clutch mechanism, and supplies oil for the bearings, for lubricating the clutch, and, when properly boosted, for operating the clutch mechanism. In the illustrated embodiment, the clutch is normally maintained in the engaged condition by a Belleville washer 120, and utilizes hydraulic pressure to release the clutch. That is the preferred construction for failsafe operation. However, in some applications, the clutch can be engaged by oil pressure and released by a spring.

In practicing the invention, the positive displacement pump 100 is driven by the belt 27, and directs the lubricating oil from a sump in the housing to an output of the clutch for return to the engine sump. Importantly, the return to the engine sump is by way of an electrically operated restricting valve 30, and the electrical control signals operate the restricting valve to create a back pressure in the piston housing to be utilized as follows. Preferably the valve limits the backpressure to a maximum of 60 psi. and has a 2 gpm capacity with no more than a 5 psi. pressure drop at 2 gpm when fully open.

Oil is supplied to the clutch assembly from the internal combustion engine to which it is attached by an inlet port 121 in the mounting bracket. The rate of flow from the engine can be limited by a fixed orifice 121b (see FIG. 6).

The oil is directed down a central passage 121a in the fan mounting shaft and the annulus created by the shaft and the bracket. The flow through the center of the shaft is ported to the clutch pack 50 where it cools the continuously slipping clutch plates 61, 63, the front ball bearings 51 and the clutch release bearing 91. The lubricating oil arrives at the sump 112 on the interior of the housing 43 and is retained there by centrifugal effects. The outer flow passes through the bearings supporting the fan shaft and the clutch brake. It arrives at the sump 112 where it rejoins the central flow. The oil, which is collected in the sump at the interior of the housing 43, is spinning at the same speed as the housing. It impinges upon the Pitot tube 110 projecting from the pump housing and is impelled into the suction of the pump by the mechanism of inertia. The pump discharges into the piston cavity 118 and from there the oil flows into the mounting bracket passage to the outlet port 129. The oil travels from the outlet port through the control valve 30 and into the engine sump 34.

With the valve unactuated, the oil encounters the least restriction and the pump develops minimum pressure. Pressure in the piston cavity with an unrestricted outlet is insufficient to overcome the clutch spring, and the clutch remains engaged. When a proportional signal is applied to the control valve 30, it moves to reduce the area of the discharge port. The oil, being incompressible, and the positive displacement pump will, ignoring inefficiencies, continue to supply its rate of capacity (e.g., 3 gpm) at any operating rpm. As a result, the speed of flow through the reduced area of the control valve must increase, and that increases the back pressure. Increasing back pressure in the piston cavity 118 opposes the spring 120, and begins to separate the clutch plates 61, 63, reducing clutch capacity. At some point, the clutch capacity will drop below the torque level necessary to drive the cooling fan, and the clutch will begin to slip. The amount of slip is directly related to the pressure applied in the pressure chamber, and that is controlled by the signal to the control valve. The desired fan speed is measured by the speed sensor 130, and the electrical control circuitry continues to alter the signal to the control valve until the sensed speed matches the desired speed. Deviations in speed can be instantly detected by the speed sensor, and the signal adjusted to control the valve according to the desired setting.

As a further feature of the invention, means are provided for assuring that the fan remains stationary under conditions when the electronics demand zero speed. In a wet clutch of the type illustrated, there will be inherent viscous drag from the cooling oil which has the possibility to drive the fan at some minimum speed, even with the clutch completely disengaged. This is undesirable in certain situations, such as very cold ambient conditions, where the engine could experience overcooling from the flow of air over the engine.

To provide for a completely stopped fan, the clutch drive mechanism according to the present invention has a brake mechanism 139 which is engaged after the clutch is fully released. The brake mechanism comprises a pair of facing brake surfaces 140, 141. One of the surfaces, 140, is non-rotational, and fixed. For that purpose, the internal surface 140 of the clutch piston 86 is utilized. The facing surface 141 is provided on the inside face of the clutch hub 65. When the piston 86 translates sufficiently to the right (forcing the clutch pressure plate 80 to the right and compressing the spring 100), the clutch will begin to slip more and more until ultimately the surfaces 140, 141 contact each other. At that point, the hub 45 will be locked in position by virtue of the contact of the face 141 (which is part of the hub)

and the face 140 which is part of the non-rotational clutch piston 86. Even in the presence of oil drag in the clutch assembly, the fan will remain in a completely stationary position.

Figure 4:
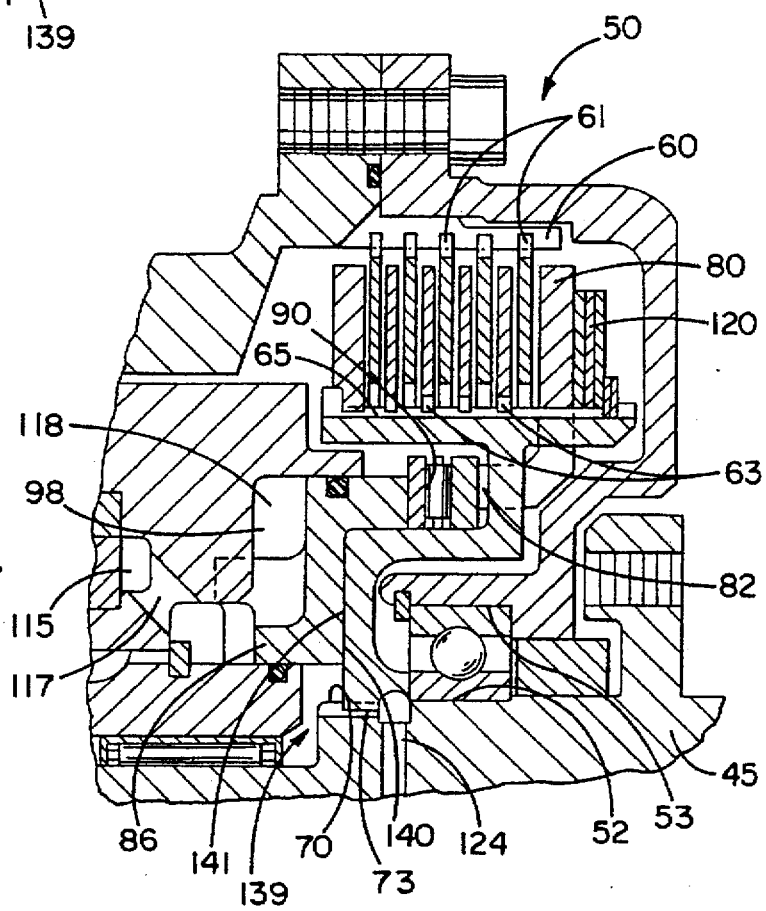

For purposes of better illustrating the clutch operation, partial sectional views of FIGS. 3 and 4 are provided. FIG. 2 has been described in detail, and illustrates the mechanism with the clutch completely engaged. The pressure chamber is at its minimum volume, and the spring 120 has the clutch plate 61, 63 fully engaged. FIG. 3 illustrates the situation where the back pressure in the pressure chamber begins to translate the clutch piston 86 to the right. It will be seen that the clutch piston operates through the thrust bearings 91–94 to translate the pressure plate 80 to the right, and that allows the clutch plates 61, 63 which are axially translatable on respective splines, to disengage, and allow the clutch to begin to slip.

FIG. 4 illustrates the condition where the clutch is fully disengaged and the brake surfaces 140, 141 are in contact with each other. That is the condition under which the clutch slip is at a maximum and the brake hub is locked with respect to the non-rotatable portion of the housing, maintaining the fan stationary.

Figure 6:
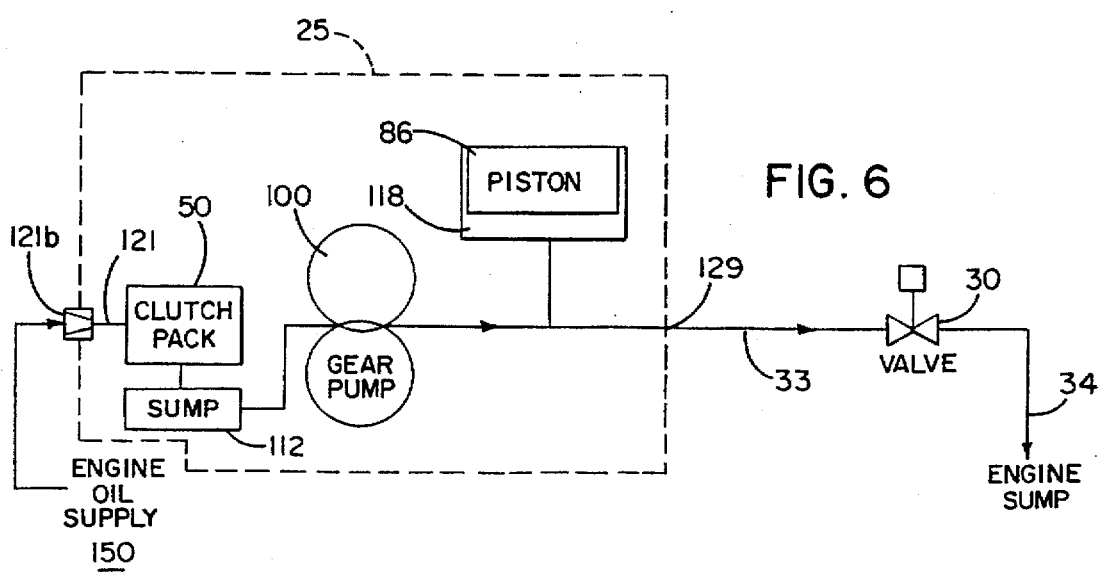
FIG. 6 is a hydraulic schematic for the fan drive system of FIG. 1.

FIG. 6 illustrates the hydraulic control circuitry which has been described in detail in connection with the hydraulic structure. The clutch mechanism 25 is schematically illustrated by the rectangle, and the operative elements within the clutch mechanism 25 are the gear pump 100 and the piston 86 within the pressure chamber 118. It will be seen that the oil circuit includes an oil inlet 121 which is driven by the engine oil supply generally indicated at 150. The oil, which it is recalled lubricates all of the clutch components, is then boosted by the gear pump 100 and passed through the pressure chamber before being expelled from the clutch housing at outlet 129. The oil then passes to the control valve 30 and returns to the engine sump 34. Operation of the control valve 30 thereupon raises the pressure in the oil system between the gear pump 100 and the valve 30. Since the piston 86 is in that region of increased pressure, the back pressure created by the valve 30 controls the position of the piston 86.

Figure 7:
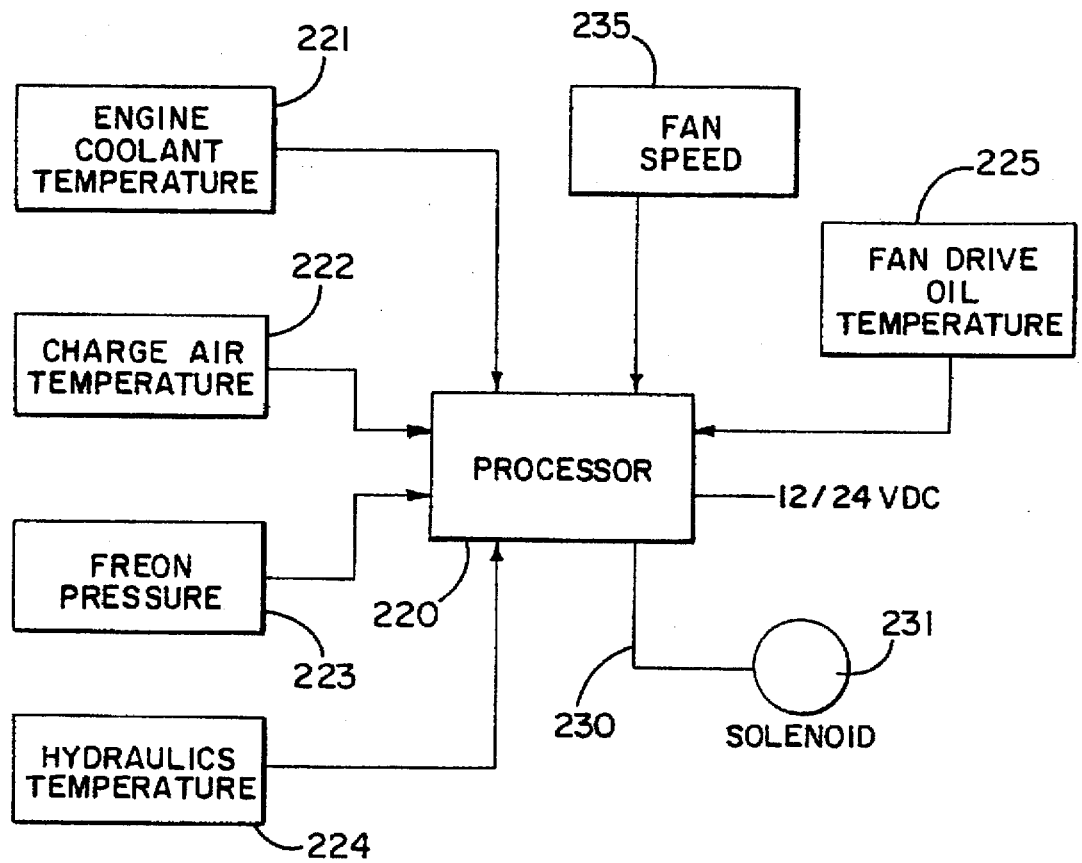
FIG. 7 is an electrical block diagram showing one form of control for the fan drive of FIG. 1.

One form of electrical circuitry of particular use with a fan clutch mechanism of the present invention is illustrated schematically in FIG. 7. It is based on the use of a central processor 220 which can be a separate computer or a part of the main electronic computer which controls the engine. The processor 220 has a plurality of inputs including an input 221 relating to engine coolant temperature, an input 222 relating to input air temperature, an inlet 223 relating to the temperature or pressure of the freon in the air conditioning system, and a further input 224 relating to the temperature of the hydraulic fluid in the system. The processor 220 is provided with a series of processing algorithms which sense these conditions and respond in whatever way is appropriate for the particular engine to produce an output signal indicative of a desired fan speed. As one example, the engine coolant temperature can be monitored so that the fan is modulated in the temperature range between about 205° and 215° F. Above 215° F., the fan is fully engaged and below 205° F. it is off. With respect to charge air temperature, the fan can be modulated in the range between about 180° and 190° F. Freon pressure at the outlet of the compressor is sensed, and when the pressure is in the range of 200–300 psi., fan modulation is used to cool the freon. Above 300 psi., the fan drive is fully engaged. With respect to hydraulic temperature, modulation could occur in the range between about 240° and 260° F. The processor senses all of those signals, and operates the fan when any of them demand additional cooling.

The inputs shown in FIG. 7 are merely examples of the types of inputs which might be used in a practical system. Engine manufacturers are capable of sensing a number of engine operating conditions and have adequate information for producing an analog output signal which is related to a desired fan speed. The shortcoming with engines and vehicles which have been produced up until this time is the inability of the fan clutch mechanism itself to respond adequately to such a signal.

In accordance with the present invention, a fan clutch mechanism is provided which can respond, and thus the control signal of FIG. 7 becomes a practical reality. The processor thereupon outputs a signal on a line 230 which is preferably an analog signal having a continuously variable level indicative of a desired fan speed. Alternatively, the processor can output a digital signal which is converted to an analog signal, or as a further final alternative, a control mechanism can be provided which is capable of responding to a digital signal. In a particular preferred form of the invention, the processor can output a pulse width modulated pulse train, readily averaged to an analog signal by a storage circuit at the input to the solenoid, and capable of driving the solenoid in the same fashion as a continuously variable analog signal. In any event, and in the simplest configuration, a proportional solenoid-operated valve 231 is provided which responds to the signal 230 to control the clutch mechanism as has been described in detail above. The speed sensor 130 produces a fan speed input 235 which is coupled to the processor 220. The processor 220 can utilize an algorithm which matches the measured fan speed against the desired speed and adjusts the output signal 230 until the two match within a desired tolerance.

One worthwhile benefit of the excess torque capacity of the wet clutch assembly is the capability to operate the clutch in a continuous slip mode without damaging the clutch facing material. Because of this capability, the clutch can be overdriven in order to provide increased fan speed at lower engine speeds, and can then be prevented from overspeeding the fan at higher engine speed. The latter feature prevents the drawing of unnecessary horsepower from the engine, and is accomplished by electronically clipping the fan speed to some preset maximum speed.

The clutch is electronically controlled, and thus any number of electrical or electromechanical inputs can be utilized to assemble the fan speed signal. A fan drive oil temperature signal 225 further illustrates a safety feature for the fan clutch system in that oil temperature can be measured, for example, at the outlet of the fan clutch drive, and if an excessive temperature is encountered indicating that the clutch is overheating, the processor 220 can respond by simply fully engaging the clutch, so there is no slippage whatsoever in the clutch mechanism until the condition is corrected.

It will now be appreciated that what has been provided is an improved clutch drive assembly. It will be seen from inspection of FIG. 2 that the axial dimension of the assembly is very limited, on the order of 8 inches, so that clutch mechanism is readily positioned in the small axial space available between the radiator and the engine. The diameter of the housing is also compact, on the order of 8 inches, so that a standard belt drive can be used. In order to fit within that confined package, a clutch mechanism capable of operating under all engine operating conditions from high speed through idle, a wet clutch assembly is provided along with an operating mechanism including an internal boost and external control. The result is the ability to provide a continuously variable fan speed mechanism for an over-the-road vehicle, operating on a single electrical signal, utilizing no more room than the conventional dry clutch assembly, yet capable of providing far superior functionality than has been achieved in the past.

What is claimed is:

1. A clutch arrangement for a cooling fan in a diesel driven vehicle, the clutch mechanism being of a size capable of fitting an envelope between a diesel engine and the cooling fan associated with a cooling radiator, the fan clutch arrangement comprising, in combination:

a compact housing having a belt drive input and an output connected to a fan hub;

a continuously variable wet clutch in the housing capable of a fully engaged position in which the input and hub are rotated at the same speed, a declutched position in which the output hub is stationary, and continuously variable positions therebetween in which the output hub is rotated at continuously variable speeds;

the housing having connections for an oil supply and an oil return connected in the path of engine oil flow from an oil pump to a sump;

a positive displacement booster pump in the housing having an inlet for receiving oil from the supply and for increasing the pressure of the oil in a pressure chamber in the housing located between the booster pump and the oil return, a piston in the housing adapted to be responsive to the pressure in the chamber for releasing and engaging the wet clutch between the fully engaged and declutched positions; and an electrically operable valve connected to the oil return for restricting the flow of oil to the sump and thereby controlling the pressure in the pressure chamber and the position of the clutch between the fully engaged and declutched positions.

2. The combination of claim 1 wherein the clutch is a continuously variable clutch capable of full engagement in which the input and hub are rotated at the same speed, a declutched position in which the output hub is stationary, and continuously variable speed selection therebetween.

3. The combination of claim 1 wherein the electrically operable valve has a continuously variable restriction whose size is dependent upon the magnitude of an electrical signal coupled to said valve, to provide continuous variability of the clutch from fully clutched to fully declutched.

4. The combination of claim 3 wherein the housing further has brake means associated therewith and configured to be engaged in the fully declutched position to lock the fan hub against rotation when the clutch is fully declutched.

5. The combination of claim 3 wherein oil from the oil supply lubricates plates of the wet clutch and bearings mounted in the housing to collect in a housing chamber, and further including a Pitot tube which propels the collected oil to the input of the positive displacement booster pump.

6. The combination of claim 5 wherein the positive displacement pump is a gear pump having an impeller mechanism driven by the belt drive input.

7. The combination of claim 3 further including spring means for biasing the clutch toward its normally engaged position, the piston being positioned to controllably disengage the clutch by compressing said spring means.

8. The combination of claim 3 wherein the system further includes electrical processor means for accepting a plurality of sensed signals from the vehicle and producing a single output signal having a level which controls the electrically operable valve and thereby the position of the clutch.

9. A compact clutch arrangement for controlling the speed of a cooling fan associated with a radiator in a motor vehicle, the vehicle having an engine and engine sump, and the wet clutch comprising in combination:

a compact housing having a belt drive from the engine, serving as a power input;

a fan hub for connection to the fan;

a wet clutch having plates connected respectively to the housing and the fan hub for controllably varying the coupling between the drive and the fan between a fully engaged position in which the housing and fan hub are rotated at the same speed, a declutched position in which the fan hub is stationary, and continuously variable positions therebetween in which the fan hub is rotated at continuously variable speeds;

the housing having an oil input for receiving lubricating oil flow from the engine for lubrication of internal clutch parts and an outlet for returning lubricating oil to the engine sump;

a positive displacement pump in the housing and driven by the belt drive, the positive displacement pump being fluidically connected between the oil inlet and outlet;

a pressure chamber in the housing located between the positive displacement pump and the outlet, a pressure plate associated with the pressure chamber for operating the clutch as a function of pressure in the chamber; and a valve connected between the pressure chamber and the engine sump for controlling the pressure in the pressure chamber and thereby the state of engagement of the clutch.

10. The combination of claim 9 further including spring bias means associated with the pressure plate for biasing the clutch toward the fully engaged condition.

11. The combination of claim 10 wherein the pressure chamber includes a clutch hub mounted for translation along a housing axis in dependence on the pressure level in the chamber, and a clutch release bearing interposed between the clutch hub and the pressure plate.

12. The combination of claim 11 wherein the clutch hub is rotationally mounted in the housing, and the pressure plate is mounted to rotate at the same speed as the fan hub, the release bearing allowing for relative rotation between the clutch hub and the pressure plate.

13. The combination of claim 9 wherein an internal surface of the rotating housing cooperates with stationary non-rotational surface to form a Pitot tube to transfer oil in the housing to the inlet of the positive displacement pump.

14. The combination of claim 9 further including a speed sensor mounted in the housing and adapted to produce a signal representative of the rotational speed of the fan hub, and circuit means connected to the speed sensor for controlling the electrically operable valve to determine the rotational speed of the fan hub.

15. The combination of claim 14 further including a processor connected to sense a plurality of engine conditions, the processor having a fan speed sensor input connected to the speed sensor, the processor having an output for controlling the electrically operable valve.

16. The combination of claim 15 wherein the engine conditions which the processor is connected to sense are selected from the group including engine coolant temperature, charge air temperature, freon pressure or temperature, and hydraulic temperature.

17. The combination of claim 16 further including a fan drive oil temperature input for signaling a condition of overheating in the housing, and the processor including means for locking the clutch in the fully clutched position when overheating is detected.

* * * * *